(12) United States Patent
Fein et al.

(10) Patent No.: US 7,638,891 B2
(45) Date of Patent: *Dec. 29, 2009

(54) WIND TURBINE AND SOLAR GATHERING HYBRID SHEETS

(75) Inventors: Gene S. Fein, Lenox, MA (US); Edward Merritt, Lenox, MA (US)

(73) Assignee: Genedics Clean Energy, LLC, Pittsfield, MA (US)

( * ) Notice: Subject to any disclaimer, the term of this patent is extended or adjusted under 35 U.S.C. 154(b) by 184 days.

This patent is subject to a terminal disclaimer.

(21) Appl. No.: 11/687,974

(22) Filed: Mar. 19, 2007

(65) Prior Publication Data

US 2008/0150291 A1 Jun. 26, 2008

Related U.S. Application Data

(63) Continuation-in-part of application No. 11/645,109, filed on Dec. 22, 2006.

(51) Int. Cl.
*H02P 9/00* (2006.01)
*F03G 7/00* (2006.01)
(52) U.S. Cl. .............................. 290/43; 290/1 R; 290/54
(58) Field of Classification Search .................. 290/1 R, 290/1 A, 43, 44, 54, 55; 322/1, 2 R, 100
See application file for complete search history.

(56) References Cited

U.S. PATENT DOCUMENTS

| | | | |
|---|---|---|---|
| 3,971,454 A | 7/1976 | Waterbury | |
| 3,982,527 A | 9/1976 | Cheng et al. | |
| 4,117,900 A | 10/1978 | Amick | |
| 4,119,863 A | 10/1978 | Kelly | |
| 4,182,960 A | 1/1980 | Reuyl | |
| 4,249,083 A | 2/1981 | Bitterly | |
| 4,314,160 A | 2/1982 | Boodman et al. | |
| 4,315,402 A | 2/1982 | Sadhukhan | |

(Continued)

FOREIGN PATENT DOCUMENTS

DE 198 02 762 A1 7/1999

(Continued)

OTHER PUBLICATIONS

Holmes, Andrew S., et al., "Axial-Flux Permanent Magnet Machines for Micropower Generation," Journal of Microelectrical Systems, vol. 14, No. 1, Feb. 2005.

(Continued)

*Primary Examiner*—Nicholas Ponomarenko
(74) *Attorney, Agent, or Firm*—Hamilton, Brook, Smith & Reynolds, P.C.

(57) ABSTRACT

Disclosed is a method and system for providing an energy gathering sheet to harness and provide energy to homes, businesses, and/or a utility grid. The energy gathering sheet is configured to receive solar or wind energy gathering devices or any combination thereof. The very small energy gathering devices (micrometer to nanometer range) are mounted onto a single installation sheet for the purposes of creating efficient and complimentary clean energy power to meet both small and large power demands. The single sheet of installable solar panels and/or wind turbines may be loosely rolled or stacked in sheets to protect the integrity of the solar panels and wind turbines. The single sheet is capable of being rolled out for efficient installations.

15 Claims, 9 Drawing Sheets

U.S. PATENT DOCUMENTS

| | | | |
|---|---|---|---|
| RE31,156 | E | 2/1983 | Dessert |
| 4,440,150 | A | 4/1984 | Kaehler |
| 4,592,136 | A | 6/1986 | Hirsch |
| 4,797,566 | A | 1/1989 | Nozaki et al. |
| 4,883,823 | A | 11/1989 | Perry et al. |
| 5,075,564 | A | 12/1991 | Hickey |
| 5,254,876 | A | 10/1993 | Hickey |
| 5,272,378 | A * | 12/1993 | Wither ............ 290/1 R |
| 5,296,746 | A | 3/1994 | Burkhardt |
| 5,606,233 | A | 2/1997 | Davis |
| 5,787,878 | A | 8/1998 | Ratliff, Jr. |
| 5,852,353 | A | 12/1998 | Kochanneck |
| 5,920,127 | A | 7/1999 | Damron et al. |
| 6,391,205 | B1 | 5/2002 | McGinnis |
| 6,409,467 | B1 * | 6/2002 | Gutterman ............ 415/4.3 |
| 6,590,363 | B2 * | 7/2003 | Teramoto ............ 320/101 |
| 6,624,530 | B1 | 9/2003 | Toulon |
| 6,630,622 | B2 | 10/2003 | Konold |
| 6,688,303 | B2 | 2/2004 | Davenport et al. |
| 6,767,161 | B1 * | 7/2004 | Calvo et al. ............ 404/71 |
| 6,809,432 | B1 | 10/2004 | Bilgen |
| 6,882,059 | B1 | 4/2005 | DePaoli |
| 6,897,575 | B1 | 5/2005 | Yu |
| 6,959,993 | B2 | 11/2005 | Gross et al. |
| 6,981,377 | B2 | 1/2006 | Vaynberg et al. |
| 7,012,188 | B2 | 3/2006 | Erling |
| 7,098,553 | B2 * | 8/2006 | Wiegel et al. ............ 290/55 |
| 7,127,328 | B2 | 10/2006 | Ransom |
| 7,192,146 | B2 | 3/2007 | Gross et al. |
| 7,193,332 | B2 | 3/2007 | Spinelli |
| 7,226,536 | B2 | 6/2007 | Adams |
| 7,226,542 | B2 | 6/2007 | Zemel et al. |
| 7,245,034 | B2 * | 7/2007 | Johnson ............ 290/1 A |
| 7,339,286 | B1 | 3/2008 | Chen |
| 7,411,308 | B2 * | 8/2008 | Parmley ............ 290/1 R |
| 7,427,173 | B2 * | 9/2008 | Chen ............ 404/71 |
| 7,434,636 | B2 | 10/2008 | Sutherland |
| 7,453,164 | B2 | 11/2008 | Borden et al. |
| 2004/0113291 | A1 | 6/2004 | Klausner et al. |
| 2004/0159536 | A1 | 8/2004 | Kamen et al. |
| 2005/0230238 | A1 | 10/2005 | Klausner et al. |
| 2006/0113118 | A1 | 6/2006 | Kim |
| 2006/0137348 | A1 | 6/2006 | Pas |
| 2007/0138797 | A1 | 6/2007 | Reidy et al. |
| 2007/0284885 | A1 | 12/2007 | Menges |
| 2008/0054638 | A1 | 3/2008 | Greene et al. |
| 2008/0149302 | A1 | 6/2008 | Fein et al. |
| 2008/0149403 | A1 | 6/2008 | Fein et al. |
| 2008/0149573 | A1 | 6/2008 | Fein et al. |
| 2008/0150284 | A1 | 6/2008 | Fein et al. |
| 2008/0150286 | A1 | 6/2008 | Fein et al. |
| 2008/0150289 | A1 | 6/2008 | Fein et al. |
| 2008/0150290 | A1 | 6/2008 | Fein et al. |
| 2008/0150291 | A1 | 6/2008 | Fein et al. |
| 2008/0150298 | A1 | 6/2008 | Fein et al. |
| 2008/0152492 | A1 | 6/2008 | Fein et al. |
| 2008/0154800 | A1 | 6/2008 | Fein et al. |
| 2008/0196758 | A1 | 8/2008 | McGuire |

FOREIGN PATENT DOCUMENTS

| | | |
|---|---|---|
| DE | 202 06 559 U1 | 8/2002 |
| DE | 103 30 601 A1 | 2/2005 |
| EP | 1 519 041 A1 | 3/2005 |
| WO | WO 2005/003553 A1 | 1/2005 |
| WO | WO 2006/121414 A | 11/2006 |
| WO | WO 2006/138516 A | 12/2006 |
| WO | WO 2008/079369 | 7/2008 |
| WO | WO 2008/115479 A2 | 9/2008 |
| WO | WO 2008/118321 A2 | 10/2008 |
| WO | WO 2008/136901 A2 | 11/2008 |

OTHER PUBLICATIONS

Zhong Lin Wang and Jinhui Song, "Piezoelectric Nanogenerators Based on Zinc Oxide Nanowire Arrays," Science, vol. 312, Apr. 14, 2006.

www.metropolismag.com, 6 pages, retrieved from Internet Apr. 19, 2007.

www.greencarcongress.com, 4 pages, retrieved from Internet Apr. 19, 2007.

www.panasonic.co.jp, 8 pages, retrieved from Internet Jan. 26, 2007.

Bourouni, K., et al., Experimentation and Modelling of an Innovative Geothermal Desalination Unit, *Desalination 125*, pp. 147-153 (Nov. 9-12, 1999).

Tzen, E., et al., "Renewable Energy Sources for Desalination," *Solar Energy 75*(5), pp. 375-379 (Nov. 1, 2003).

Garcia-Rodriguez, L., "Seawater Desalination Driven by Renewable Energies: A Review," *Desalination 143*(2), pp. 103-113 (May 20, 2002).

Kalogirou, S.A., "Seawater Desalination Using Renewable Energy Sources," *Progress in Energy and Combustion Science 31*(3), pp. 242-281 (Jan. 1, 2005).

Belessiotis, V., et al., "The History of Renewable Energies for Water Desalination," *Desalination 128*, pp. 147-159 (2000).

Awerbuch, L., et al., "Geothermal Energy Recovery Process," *Desalination 19*, pp. 325-336 (1976).

International Search Report for PCT/us2008/006034, date of mailing Oct. 24, 2008.

International Search Report for PCT/US2008/003603, date of mailing Oct. 31, 2008.

International Search Report and The Written Opinion of the International Searching Authority from PCT/US2008/003513. Date of Mailing May 8, 2009.

\* cited by examiner

WIND TURBINE AND SOLAR GATHERING HYBRID SHEETS

RELATED APPLICATION

This application is a continuation in pan application of U.S. application Ser. No. 11/645,109, entitled "SYSTEM AND METHOD FOR CREATING A NETWORKED INFRASTRUCTURE DISTRIBUTION PLATFORM OF FIXED AND MOBILE SOLAR AND WIND GATHERING DEVICES", filed on Dec. 22, 2006. The entire teachings of the above application are incorporated herein by reference.

BACKGROUND OF THE INVENTION

It is well known that wind power turbines can generate power that can be delivered via interconnection to existing grid systems or can be used to power individual homes, businesses and utilities. Most, if not all, wind power systems that are used to gather large amounts, in the Megawatt range of power, are large structure wind turbines many of which are at least 100 feet high. In the past, small wind powered turbines have also been placed high up from the ground usually at least 15 feet high. Also, most small wind power turbine systems are utilized to power a single home, business, or elements of that home or business.

Currently, large wind installations in order of 100 foot or greater sized turbines dot the landscape of the planet. These turbines are often positioned in remote fields, out to sea, or on private property away from public infrastructure. Small wind installations of turbines and other gathering devices in the 5 to 30 foot range are typically utilized in three deployments. The first deployment features clusters of small to mid sized turbines set up in remote windy areas such as the desert environment near Palm Desert, Calif. The second deployment features isolated powering of small homes and businesses, such as those in remote arctic or other extremely cold climates where heating and cooling infrastructure do not exist, or is augmented at the micro use level for one home or business by small wind turbine implementation. The third deployment model features isolated powering of entities for government utilities, such as the isolated powering of single light stands at the Hanauma Bay National Park public parking lot in Oahu, Hi.

Conventional models address power plant and isolated use models for the generation and distribution of wind power. Large turbines generate Megawatt volumes of power to be utilized locally or interconnected back to the grid system. Small wind generation systems are typically used to solve local power issues, such as street lights or home or business power needs. Small wind generation systems can also be interconnected to a grid system for the purpose of selling the power generated.

Unfortunately, the existing conventional uses have certain limitations in distribution and deployment. Large turbines have faced environmental and Defense Department concerns. Environmentalists fear that the noise and size of turbines will disrupt both scenic and habitat conditions in addition to threatening the well being of birds that may be caught in the large turbine blades. Department of Defense concerns have been raised over the large turbines interfering with radar signals and tracking. Large turbine systems that are placed far away from existing infrastructure also incur a large expense in the transportation or building of infrastructure to carry the power generated by the turbine system. Finally, the large turbine system represents a major, volatile investment for a single turbine; if the wind is not present or wind currents change then the turbine would be viewed as a poor investment because it will not generate enough power to be profitable. Also, if the turbine breaks for any reason it will produce zero power as it is a large and single entity. Large turbines also require labor intensive maintenance and monitoring. The life cycle for large wind turbines is 20 years and decommissioning the large wind turbine is another environmental issue to contend with.

Small wind power utilized in isolated areas and for private homes, businesses and individual use is a great way to introduce clean energy on a unit by unit grass roots level.

The issue with isolated uses which the present invention addresses is that isolated uses are isolated by definition. Isolated uses do not have the ability to directly power businesses or residential sites over a long stretch of land covering tens, hundreds, thousands or hundreds of thousands of miles providing easy access to direct powering of entities as well as multiple grid interconnection points. Small turbines would be an efficient use of space and cost to gather clean energy. The problem is that individual implementation would be tedious and extremely challenging as the turbines get smaller, especially for turbines that are under one inch in either horizontal or vertical measurement. Another limitation is that the sheeting itself would not promote any energy gathering activity on its surface.

SUMMARY OF THE INVENTION

Accordingly, there is a need for an integrated tiny wind turbine power infrastructure that can easily be connected to multiple direct sources or various grid interconnection points. Components of these very small wind turbines, such as the tiny wiring from turbines forming a tiny wiring grid, with wire turbines on the micrometer scale together, have been shown to have super conductive properties which may help increase the energy gathering efficiency of tiny wind turbines. Further, turbines of various sizes may be made from wind turbines in the 50 micrometer size which are constructed with advanced lithography and laser tools to tiny wind turbines an eighth of an inch long and up that can be made via a standard molding and forming process. Also, the use of tiny wind turbines allows for the deployment of billions of turbines in spaces where larger turbines can not fit, such as curved guardrails, and/or on top of vehicles and mounted vertically or horizontally in positions that would not be functional for larger turbines.

The functions of the tiny turbines would be wide-ranging: from generating heat with their energy by affixing them to winter jackets and gloves to rolling out large strips of installable sheets of tiny turbines for use on public and private highways via median and/or outside of breakdown lane. Private highways and municipalities have existing maintenance crews as well as existing relationships with contracted infrastructure building providers who can be trained to install the wind generation systems along specified parts of roadways. The small wind generating devices would offer numerous advantages. First, the wind power generation systems can be small and noiseless, small enough to fit millions or billions of tiny turbines on a median between opposite sides of a divided highway with existing median. Second, the energy generated by the devices may be distributed directly to homes or businesses along the highway route. For example, the generated energy could be used to power homes. An additional potential use of the generated energy would be to clean power for the electrolysis of hydrogen for filling stations along a highway, either utilizing hydrogen conversion at individual filling stations or at a conveniently located hydrogen conversion plant adjacent to the highway or roadway. Third, other clean energy sources such as solar, geothermal and other heat conversion technologies may be used to create a multi-source clean energy 'power grid' along with, or in tandem with, the 'grid' in place via potential for the connection of miles of wind power gathering, storage and transfer of generated power.

Fourth, these infrastructures benefit the wind power generator companies; the roadway owners would benefit from lease or easement revenue. A product could benefit from an easily installed 'skin' or sheet of the tiny turbine energy gathering material, as well as provide a stable and consistent infrastructure project generating a service provider economy for clean energy production as well as the environment. Fifth, roadways are a consistent source of wind and by having small wind energy capture generating devices close to the ground, such as small noiseless spiral or helix-style turbines, enable the devices to capture wind energy generated by passing vehicles as well as existing currents. Sixth, the power generated by this system may also be connected to a grid system at many different and convenient points located very close to the existing grid infrastructure. Also, by mounting numerous small turbines on sheets, the problem of both wiring, and installation is solved, in large part with only the sheets left to install and not the individual turbines, which are preinstalled to the sheets. By making the sheets covered with solar gathering materials, the total space occupied by the installation sheets is fully used to gather energy. This model is further optimized by the use of hybrid solar wind turbines, i.e., wind turbines that are actually covered or partially covered by solar energy gathering material.

The present invention relates to an energy gathering sheet or method for providing the same. The present invention relates to the creation of wind powered very small though ranging in size, noiseless to low noise wind turbines. The turbines may be covered and formed with solar energy gathering material, mounted onto installation sheets covered with solar gathering material to utilize for the purposes of creating efficient and complimentary clean energy power to meet both small and large power demands. The small wind power turbines will be inefficient to install individually once they reach a certain small size. The turbines may be mounted on a single sheet of installable solar gathering covered material that may be loosely rolled or stacked in sheets to protect the integrity of the turbines and to allow for large areas of sheeted turbines to be rolled out and installed efficiently. The sheets having circuit connections would be configured to receive a plurality of energy devices. The power generated by the very small (micrometer to nanometer) wind turbines and solar sheeting in the units can be used to both connect electrically to a destination. The destination may be a grid or to power homes businesses or systems without connecting to existing grid systems.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

The present invention, in accordance with one embodiment relates to the creation of a series of tiny power generating wind turbines mounted upon a single installation sheet which is covered by solar gathering material and contains all of the wiring necessary to transfer energy gathered by the turbines to an energy storage system, conditioning system and distribution point. These turbines may also be covered partially or totally in solar energy gathering material themselves and can serve a variety of uses generating small or large amounts of energy based upon the number and size of the turbines that are deployed in a given installation. The micro turbines fall into two categories, those that can be manufactured using nanotechnology practices that are as large as ½" in any dimension to those that are as small as a few hundred nanometers. These tiny wind turbines can be manufactured on sheets up to a size of 5' turbines that are wired together to efficiently distribute the total electricity gathered by all turbines on an installation sheet and transfer that electricity into an organized distribution system or desired destination point.

Figure 1:
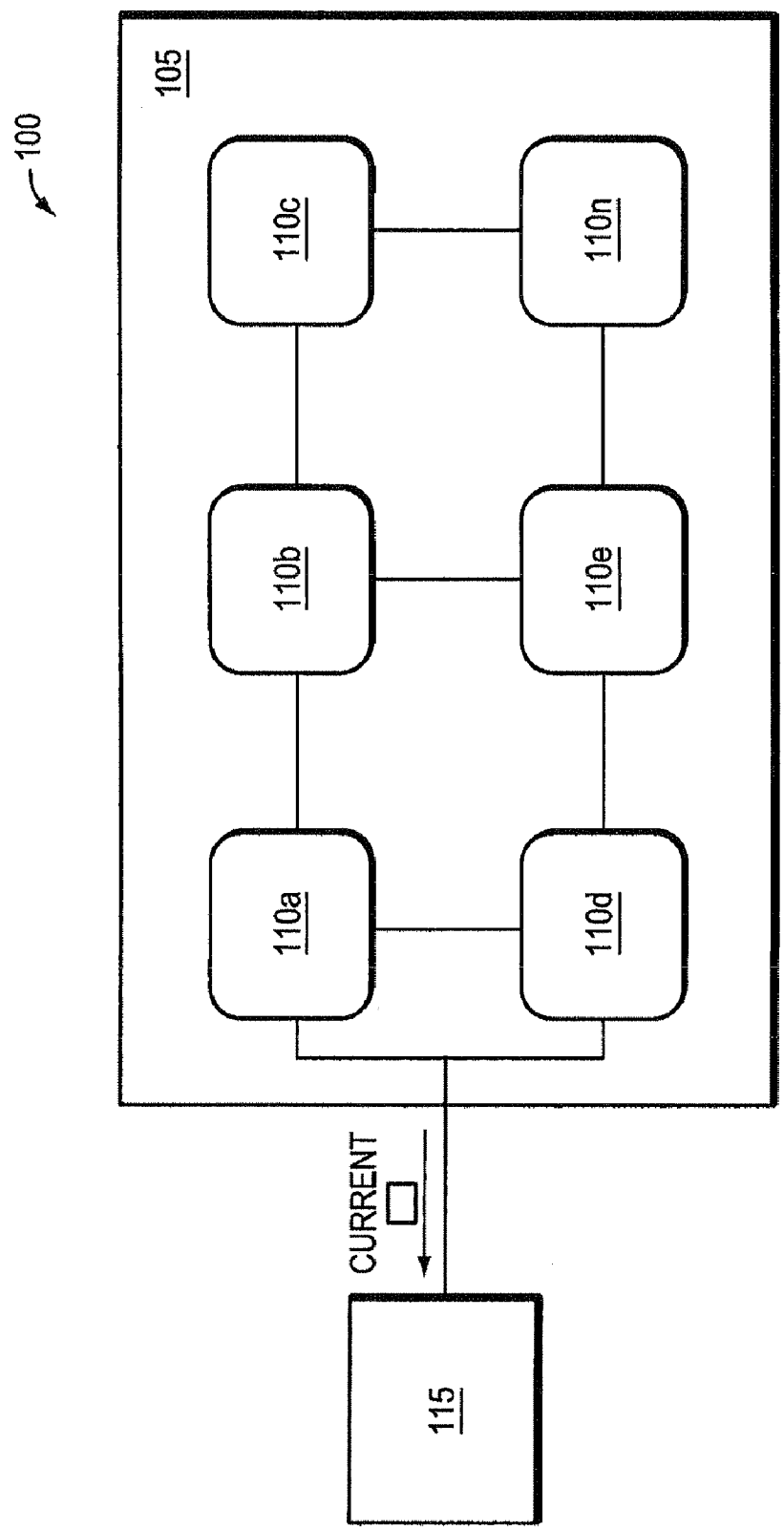
FIG. 1 is an exemplary schematic of an energy gathering system in accordance with an embodiment of the present invention.

FIG. 1 is an exemplary schematic of an energy gathering system 100. The energy gathering system 100 may include a sheet 105 configured to receive a plurality of energy devices 110a, 110b, . . . , 110n. The plurality of energy devices 110a, 110b, . . . , 110n have various sizes ranging on the order of nanometers to micrometers per dimension. The plurality of energy devices 110a, 110b, . . . , 110n may be wind energy generating devices, solar generating devices, or any combination thereof. The plurality of energy devices are capable of harnessing solar and wind energy. The sheet 105 may have gathered the necessary circuitry required to connect the plurality of energy devices 110a, 110b, . . . , 110n, for example converters for converting gathered solar and wind energy to storable electrical energy. The plurality of energy devices 110a, 110b, . . . , 110n may be installed onto the sheet 105 at the manufacturer's facility or in the field. The sheet 105 having circuit connections provides the generated (resulting) electrical energy to a desired destination 115. The wind and/or solar energy is captured by the plurality of energy devices 110a, 110b, . . . , 110n and is turned into electrical energy by the sheet 105.

Figure 7:
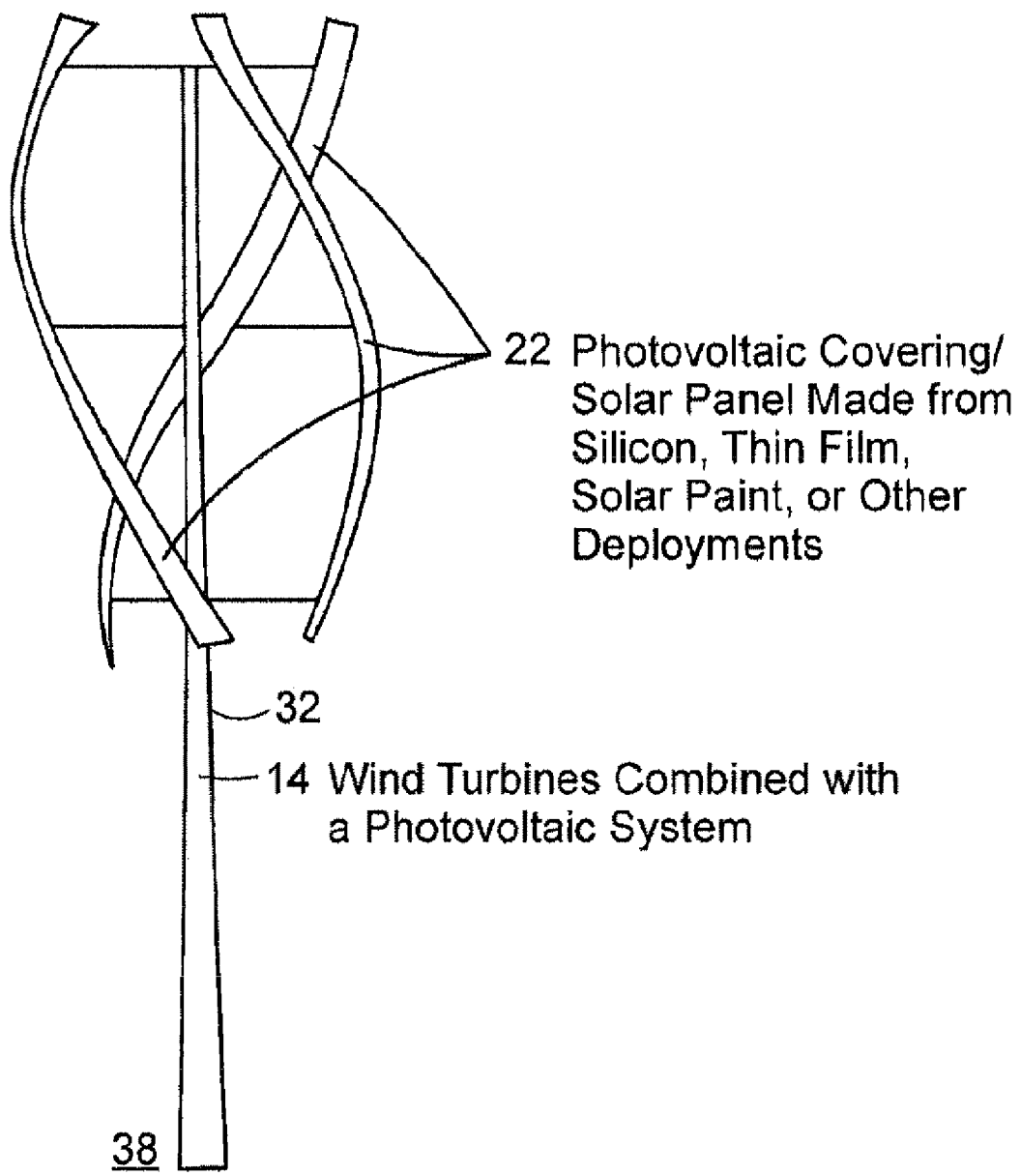
FIG. 7 illustrates the use of wind turbines that may be covered in solar gathering materials, such as thin films that may be molded to parts of the turbine.

FIG. 7 illustrates a helix type wind turbine generator 14 that may be covered in solar gathering photovoltaic materials such as silicon thin films that may be molded to parts of the wind turbine generator that do not interfere with the wind turbine generator's fundamental operation, for example, the parts indicated by reference numeral 22. The solar energy that is gathered is then fed to a central rod 32 and carried down the base of the wind turbine generator 38 where it can then be channeled via wiring typical to the industry into a ground-based energy storage system, for example, a battery pack or battery array deployment. Other wind energy gathering devices, such as energy devices 110, may similarly be covered in solar gathering materials as mentioned above.

Figure 2:
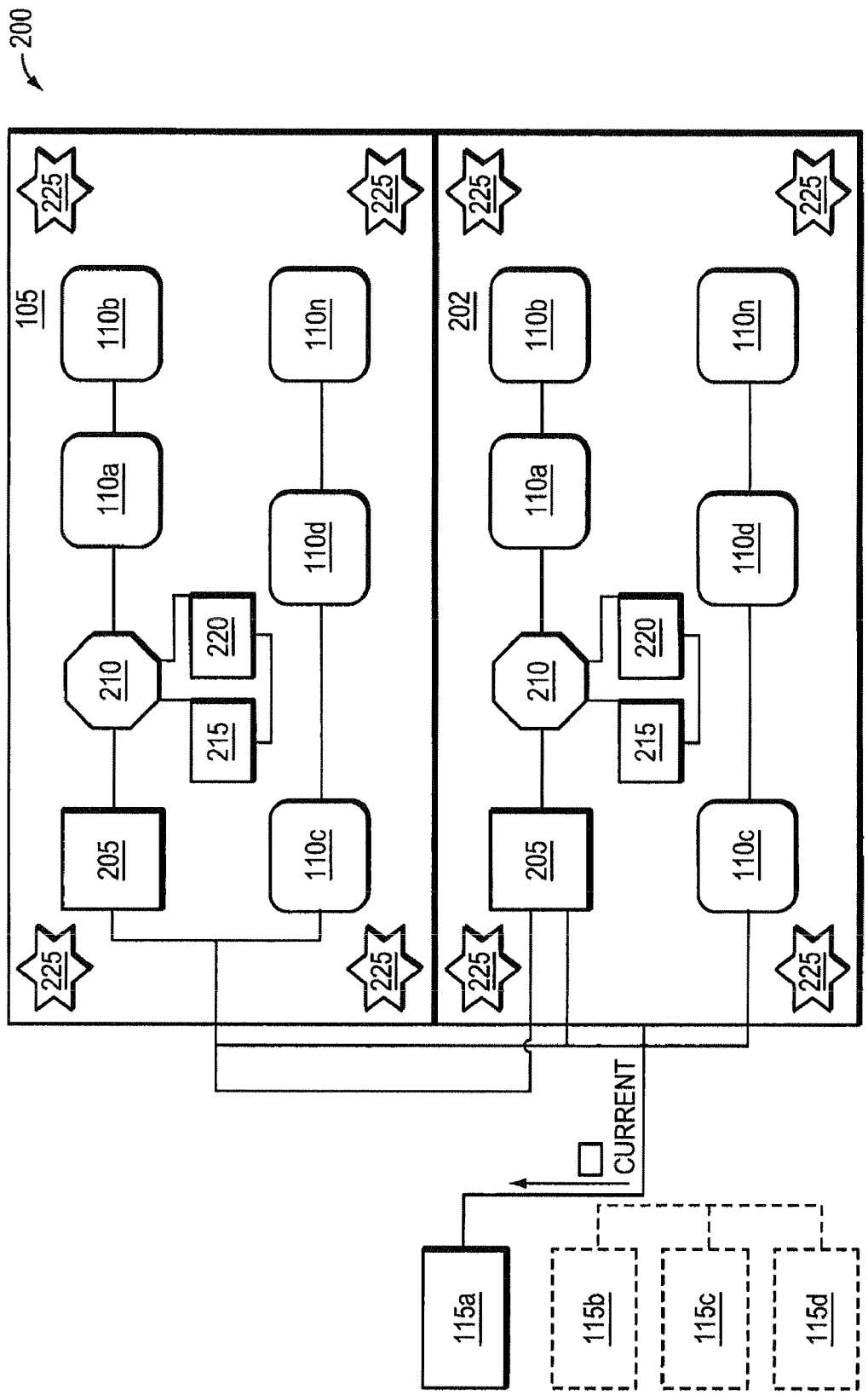
FIG. 2 is an exemplary schematic of an energy gathering system connecting to other energy gathering systems in accordance with another embodiment of the present invention.

FIG. 2 is an exemplary schematic of an energy gathering system 200 showing sheet 105 connecting to another sheet 202 to provide generated electrical energy to the desired destination 115. The desired destination 115 may be roadway system electricity grids 115a, residential homes 115b, businesses 115c, and/or reporting and billing systems 115d. In another embodiment, the sheet 105 may be similar to the sheet 202. The sheet 202 may include similar components as sheet 105 of FIG. 1 in addition to an energy storage unit 205, processing unit 210, transmitter 215 and receiver 220. The energy storage 205 is configured to store the harnessed and converted energy from the plurality of energy devices 110a, 110b, . . . , 110n.

Each processing unit 210 may process information that is related to the respective energy gathering sheet 105, 202. The information may include, for example, the amount of stored energy in the storage unit 205 and/or the operational status of the sheet 105, 202. The information in another example is the amount of power each of the plurality of energy devices 110a, 110b, . . . , 110n is harnessing. The operational status for example, may be one of the plurality of energy devices 110a, 110b, . . . , 110n is out of service due to a faulty blade on the wind energy gathering device.

Each transmitter 215 may transmit information related to respective the energy gathering sheet 105, 202 to a reporting and billing system 115d. The reporting and billing system as discussed in patent application entitled "REPORTING AND BILLING SYSTEM FOR CLEAN ENERGY INFRASTRUCTURE" by inventors Gene S. Fein and Edward Merritt, (Attorney Docket No. 4122.1023-000), and incorporated herein by reference. Each receiver 220 may receive other information from the reporting system 115d, such as a signal to shut down one of the plurality of energy gathering devices 110a, 110b, . . . , 110n. The processing unit 210 may in response to the receiver 220 receiving such a command signal, shut down one of the plurality of energy gathering devices 110a, 110b, . . . , 110n. The transmitter 215 and receiver 220 may send the information to the desired destination 115a, 115b, 115c, 115d, via a hard line connection or wireless connection. The receiver 220 may be coupled to the Internet (not shown) through many interfaces including but not limited to a local area network (LAN) or a wide area network (WAN), dial-up connection, cable or SL modems, or special high speed Integrated Services Digital Network (ISDN) lines.

The energy gathering sheets 105, 202 may include a strong polymer material that may be the only material used in the sheet skeleton or may be reinforced with metal, a material layer, magnetic layers, insulation layers, trapped air or gas layers, or a trapped fluid layer. The sheets 105, 202 external polymers or solar panel, mirror or films exterior smooth coating repels debris better than the bare ground. The sheets 105, 202 may come with the energy gathering devices 110a, 110b, . . . , 110n already installed or with specified holes for installation mounting thus assuring proper spacing between the energy gathering devices 110a, 110b, . . . , 110n and efficient shipping. The sheets 105, 202 may be pre-wired so that in the field, they merely need to be connected together or connected to a power storage or distribution element to enable the flow of generated (resulting) electricity.

Sheets 105, 202 may be anchored by at least one anchoring mechanism 225 to their installation site based upon the specifications of the installation site. For example, along a road, the sheets 105, 202 may be anchored at the corners to the desired surface, such as the ground. The sheets 105, 202 may then be tacked down by strips of material that run lengthwise and widthwise using the at least one anchoring mechanism 225 as primary skeletal reliance points in terms of force and stress placed upon the sheets 105, 202 in operation. The sheets 105, 202 or anchoring mechanisms 225 may also be clamped, locked, interlocked, glued, painted on, otherwise adhered or magnetized onto specific installation sites. Tiny wired or wireless sensors, relays or micro sensors, such as reciprocities with transmitters suitable for sending data to ultimately be received within the reporting and billing system 315d, may be attached to the wired exit point on each sheet 105, 202 to gauge electrical power flow similar to a crude totalizing meter so that the efficiency of the individual or groups of sheets 105, 202 can be monitored remotely.

The sheets 105, 202 can be cut to fit specific installation sizes before they leave the factory or distribution point.

Figure 3B:
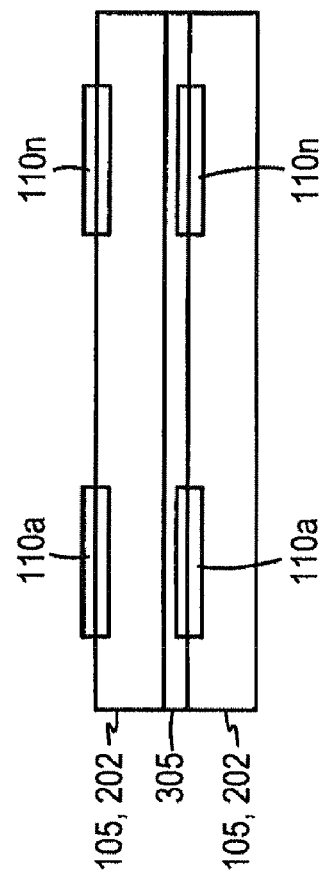
FIGS. 3A and 3B are exemplary schematics of an energy gathering system capable of being in a rolled up or stacked position in accordance with an embodiment of the present invention.
Figure 3A:
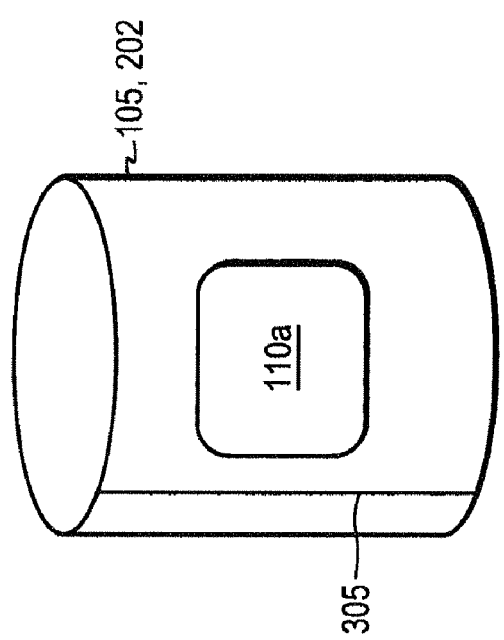

FIGS. 3A and 3B are exemplary schematics of an energy gathering system capable of being in a rolled up or stacked up position. The sheets 305, 202 may protect the energy gathering devices 110a, 110b, . . . , 110n, such as turbines, in the rolled up position (FIG 3A) or stacked up position (FIG. 3B) for travel from the factory because the sheets 105, 202 are held or supported with tear away sheet separators 305 which protect the weight and force of the rolled up sheets from damaging the turbines during travel. For example, these separators 305 may be similar to pizza box spacers, except rather than using plastic, they 305 may be formed of recycled paper. The sheets 105, 202 may have an added advantage of being able to pre-install energy gathering devices 110a, 110b, . . . , 110n, such as turbines of different sizes on the same installation sheet 105, 202 in a random order or in a preferred embodiment in a properly spaced stratum configuration.

Figure 4:
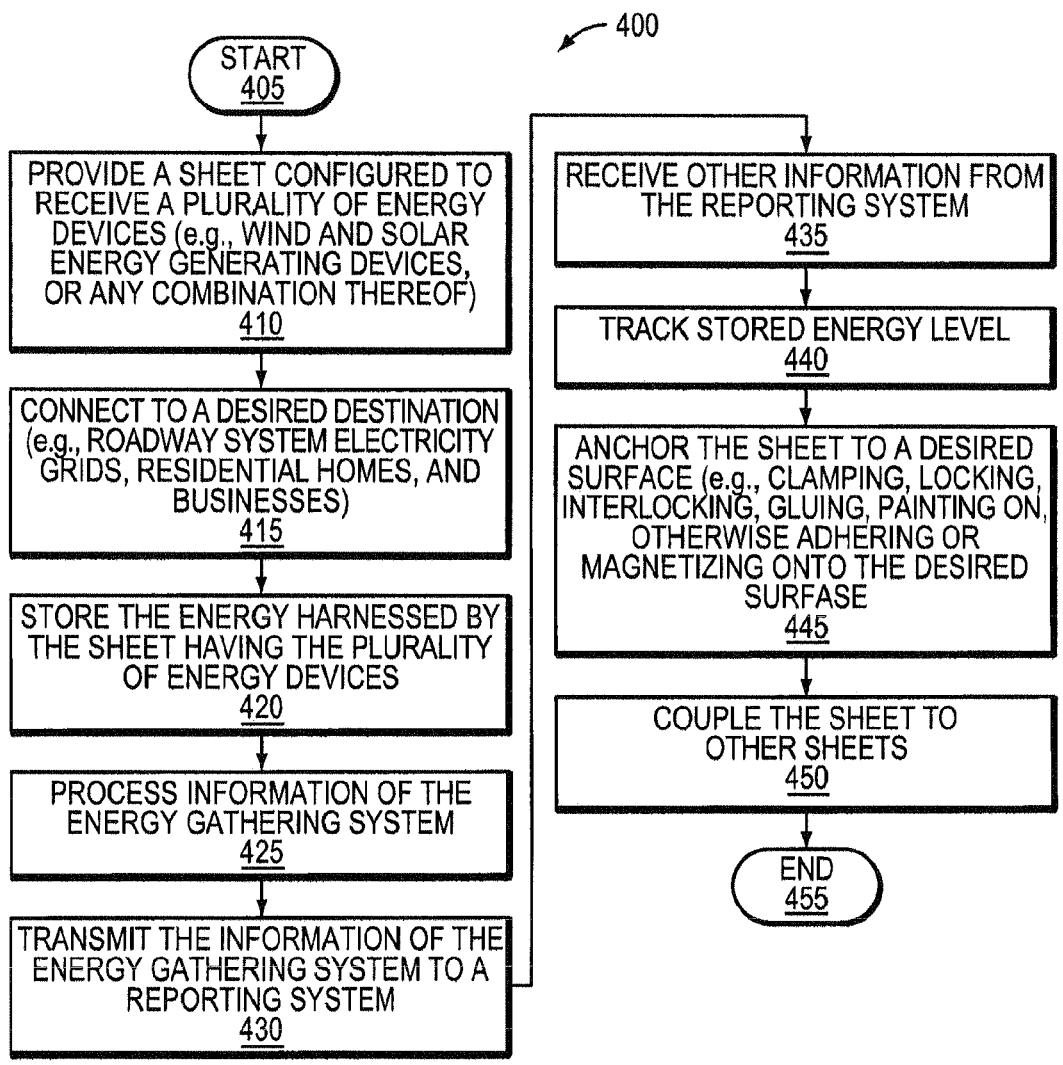
FIG. 4 is an exemplary flow diagram of an energy gathering system performed in accordance with an embodiment of the present invention.

FIG. 4 is an exemplary flow diagram 400 of an energy gathering system 200 performed in accordance with an embodiment of the present invention. The energy gathering system 200 starts at 405 and provides a sheet 105, 202 having circuit connections configured to receive energy devices 110a, 110b, . . . , 110n having various sizes in the micrometer to the nanometer range. The energy devices 110a, 110b, . . . , 110n may be wind or solar energy generating devices, or any combination thereof (410). The sheet 105, 202 is then electrically connecting to mid providing resulting electrical energy to the desired destinations 115 (415). The desired destinations 115 may be roadway system electricity grids 115a, residential homes 115b, businesses 115c, and/or reporting and billing system 115d.

The energy gathering system 200 may store the energy harnessed by the sheet 105, 202 having the energy devices 110a, 110b, . . . , 110n (420). The harnessed energy (e.g. converted and stored) may be stored in the energy storage unit 205. The processing unit 210 may process information that is related to the energy gathering sheet 105, 202 (425). The information may include, for example, keeping track of the amount of stored energy in the storage unit 205 and/or the operational status of the sheet 105, 202. The information in another example is the amount of power each of the plurality of energy devices 110a, 110b, . . . , 110n is harnessing. The operational status for example, may be an indication that one of the plurality of energy devices 110a, 110b, ..., 110n is out of service due to a faulty blade on the wind energy gathering device.

The transmitter 215 may transmit information related to the energy gathering sheet 105, 202 to any of the desired destinations 115, such as the reporting and billing system 115d (430). The receiver 220 may receive other information from the desired destinations 115, such as the reporting and billing system 115d (435). The other Information, for example, may be a signal to shut down one of the plurality of energy gathering devices 110a, 110b, ..., 110n.

The amount of stored energy in storage unit 205 of sheets 105, 202 is detected and tracked at 440. This provides additional information that the transmitter 215 may transmit at 430.

Each sheet 105, 202 may be anchored by at least one anchoring mechanism 225 to their installation site based upon the specifications of the installation site (445). For example, along the road, the sheets 105, 202 may be anchored at the corners to the desired surface, such as the ground. The sheets 105, 202 may then be tacked down by strips of material that run length and width wise using the at least one anchoring mechanism 225 as primary skeletal reliance points in terms of force and stress placed upon the sheets 105, 202 in operation. The sheets 105, 202 or anchoring mechanisms 225 may also be clamped, locked, interlocked, glued, painted on, otherwise adhered or magnetized onto specific installation sites. The sheet 105, 202 may be electrically connected to other sheets (450) to harness more energy before ending at 455.

Figure 8:
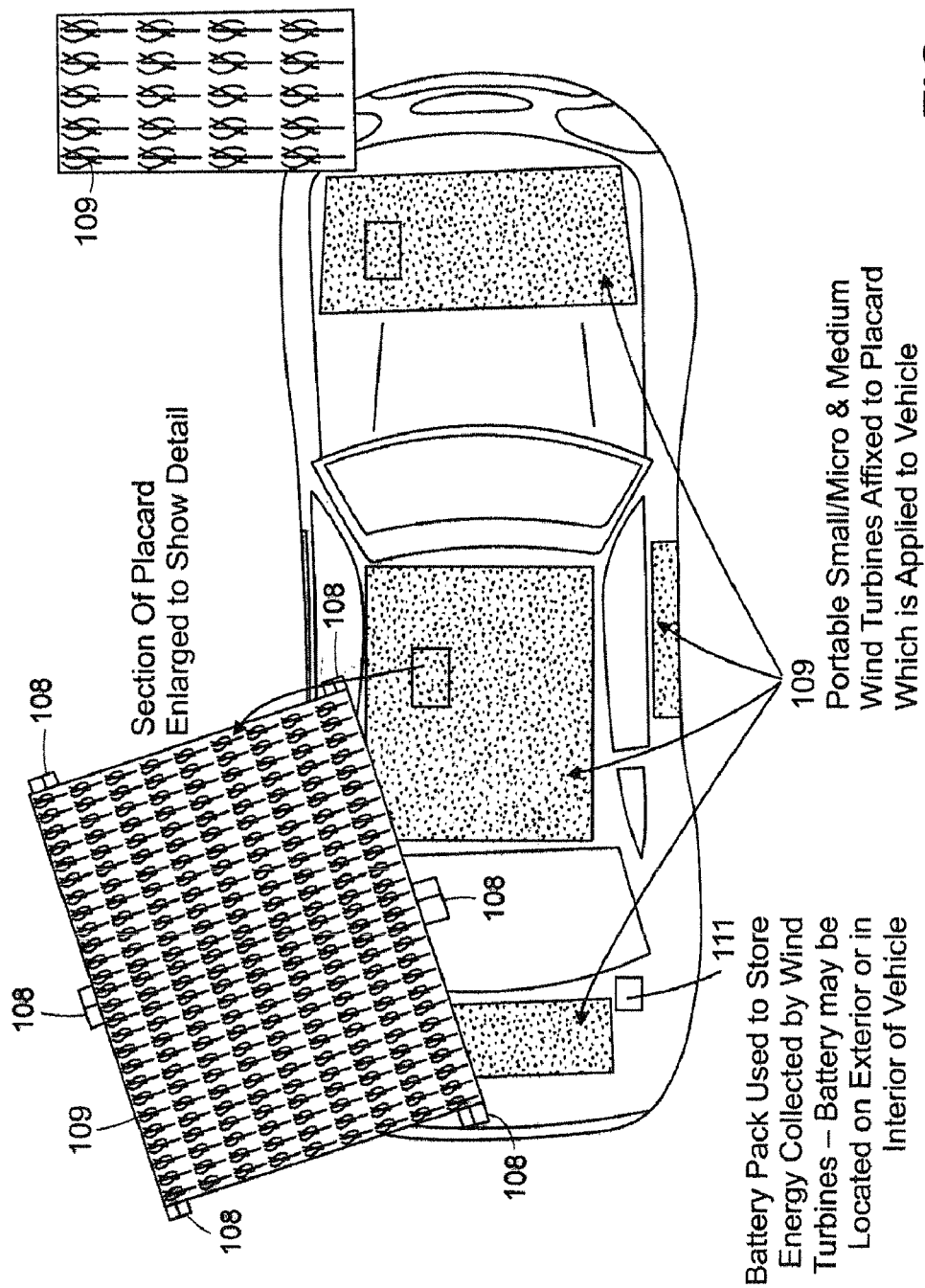
FIGS. 8 and 9 illustrates sheets of energy devices as being affixed to a vehicle.
Figure 9:
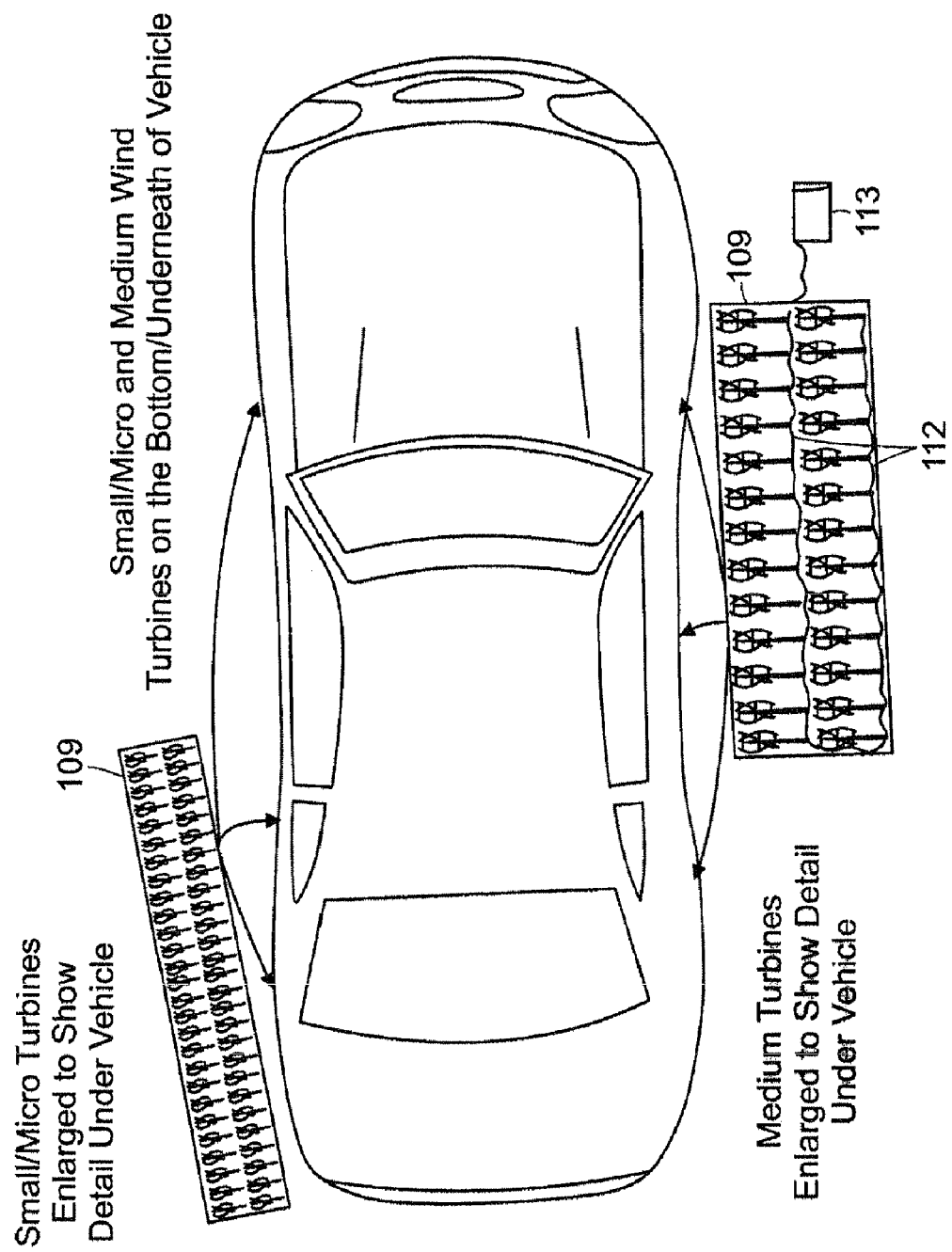

FIGS. 8 and 9 illustrate the sheets of energy devices 109 as being affixed, for example, to a vehicle using snap on clips, adhesive, magnetic bonding, static charge bonding, or a locking screw mounting system 108, which may be permanently or removably mounted during the vehicle manufacturing process installation. Millions of turbines may occupy a single vehicle installation sheet or placard 109. In addition to securing the turbines, the installation sheet 109 forms a matrix grid of wiring 112 that is comprised of wiring taken from the generator of each individual turbine. The matrix of wiring from each turbine is then delivered to a battery for charging in one integrated wired output connection 113. One or more batteries may be installed on the interior, exterior 111, trunk or underbelly, or under the hood of the vehicle. The helix wind turbine installation sheets 109 are not just meant to be mounted on top of a vehicle but may also be installed in areas under a vehicle 109. The lack of uniform wind and the presence of 'dirty wind' makes the use of the helix turbine advantageous and efficient for collecting wind energy from different parts of a moving vehicle.

Figure 5:
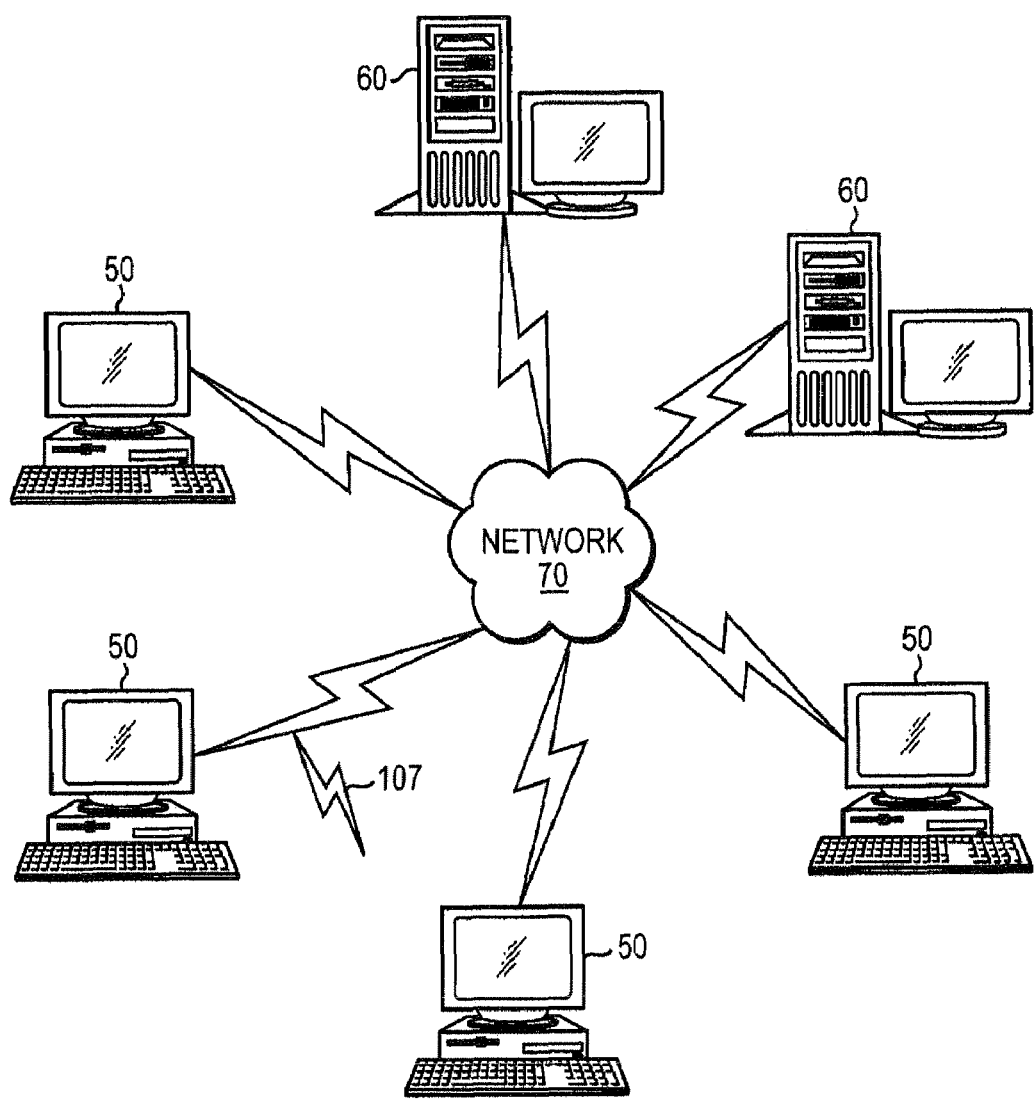
FIG. 5 is a schematic view of a computer environment in which the principles of the preset invention may be implemented.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
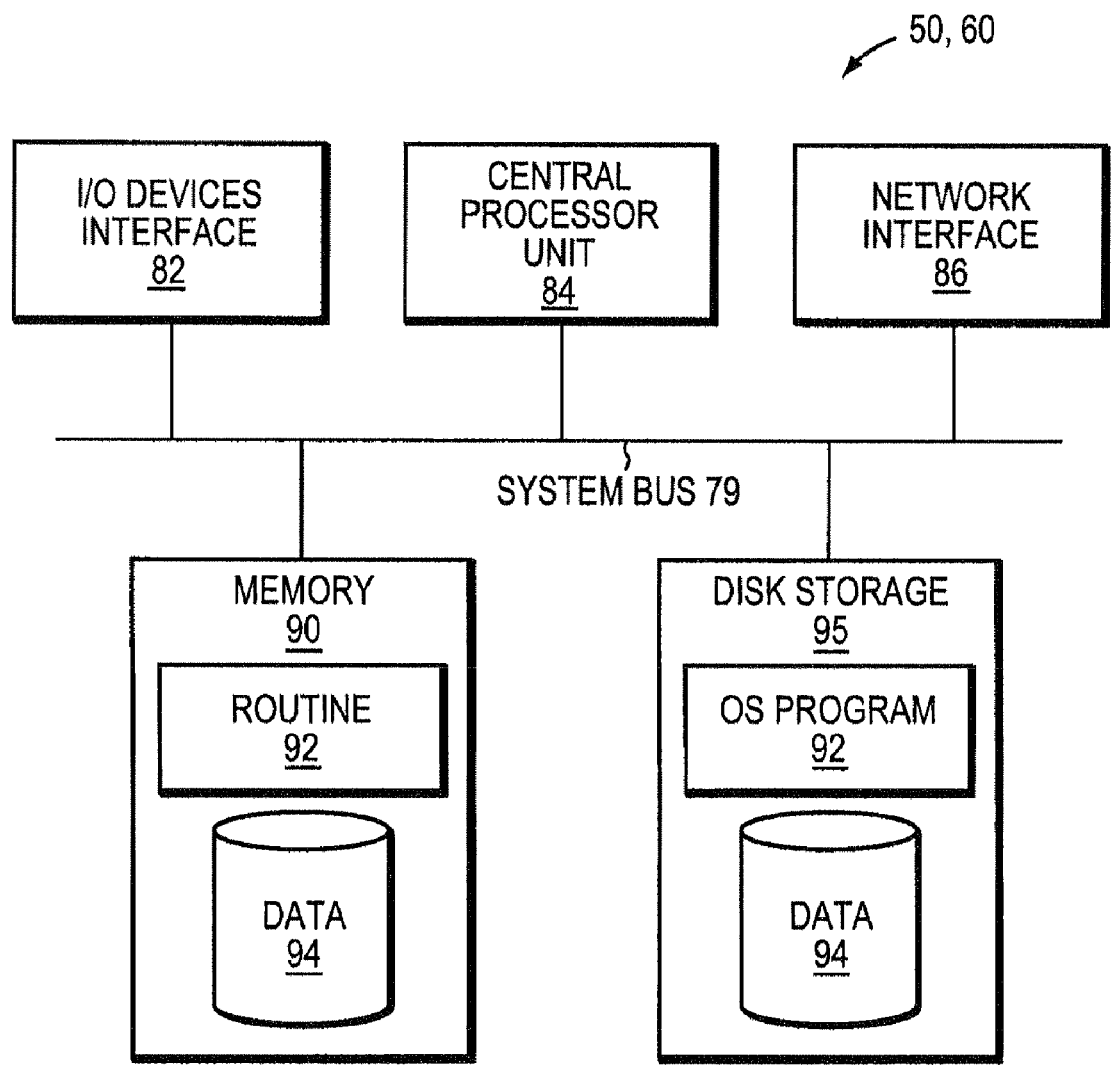
FIG. 6 is a block diagram of the internal structure of a computer from the FIG. 5 computer environment.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data, transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output, devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network, (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Further, the present invention may be implemented, in a variety of computer architectures. The computer network of FIGS. 5 and 6 are for purposes of illustration and not limitation of the present invention.

While this invention has been particularly shown and described with references to preferred embodiments thereof, it will be understood by those skilled in the art that various changes in form and details may be made therein without departing from the scope of the invention encompassed by the appended claims.

It should be understood that there may be other desired destinations as discussed above, such as existing electrical power company.

It should be further understood that there may be more than two energy gathering systems 100, 200 with sheets 105, 202 coupled together. For example, there may hundreds of sheets electrically connected together in the installation location.

It should be further understood that the flow diagram of FIG. 4 is merely exemplary, and other configurations, arrangements, additional blocks, fewer blocks, and so forth are possible in other embodiments.

What is claimed is:

1. An energy gathering system, comprising:
   an energy gathering sheet configured to operatively hold a plurality of less than one inch in size hybrid wind solar energy devices, the energy gathering sheet having circuit connections configured to receive the plurality of energy devices and configured to convert energy harnessed by the plurality of energy devices to storable electrical energy;
   an energy storage unit coupled to the energy gathering sheet and configured to store electrical energy converted from energy harnessed by the plurality of hybrid wind solar energy devices;
   a processing unit operatively coupled to the energy gathering sheet and configured to process information relating to the energy gathering sheet;
   at least one anchor configured to attach the energy gathering sheet to a surface; and
   at least one interface configured to electrically connect to additional energy gathering sheets, and configured to electrically connect to and provide the stored electrical energy from the energy storage unit to a destination, the destination including at least one of a roadway system electricity grid, residential home, and business.

2. The energy gathering system of claim 1 wherein sizes of the hybrid wind solar energy devices are in the range of micrometers to nanometers.

3. The energy gathering system of claim 1 further comprising:
   a transmitter configured to transmit the information relating to the energy gathering sheet from the processing unit to a reporting system; and
   a receiver configured to receive signals from the reporting system.

4. The energy gathering system of claim 1 wherein the information includes stored energy amount in the energy storage unit.

5. The energy gathering system of claim 1 wherein the at least one anchor enables the energy gathering sheet to be at least one of clamped, locked, interlocked, glued, painted on, adhered and magnetized onto the surface.

6. The energy gathering system of claim 1 further including a protection layer to protect the energy gathering sheet when rolled up and when stacked.

7. The energy gathering system of claim 1 wherein the energy gathering sheet is formed of layers comprising at least one of polymer, metal, trapped air trapped gas, and trapped fluid.

8. A method for gathering energy in a roadway energy system, the method comprising:
   providing an energy gathering sheet configured to operatively hold a plurality of hybrid wind solar energy devices less than one inch in size, the energy gathering sheet having circuit connections configured to receive the plurality of energy devices and configured to convert energy harnessed by the plurality of energy devices to storable electrical energy;
   anchoring the energy gathering sheet to a surface;
   coupling the energy gathering sheet to additional energy gathering sheets;
   electrically connecting the energy gathering sheet to destination, the destination including at least one of a roadway system electricity grid, residential home, and business;
   storing electrical energy converted from energy harnessed by the plurality of hybrid wind solar energy devices;
   processing information relating to the energy gathering sheet; and
   providing the stored electrical energy to the destination.

9. The method according to claim 8 wherein sizes of the hybrid wind solar energy devices are in the range of micrometers to nanometers.

10. The method according to claim 8 further comprising:
    transmitting the information relating to the energy gathering sheet to a reporting system; and
    receiving signals from the reporting system.

11. The method according to claim 8 wherein processing the information relating to the energy gathering sheet includes tracking stored energy level.

12. The method according to claim 8 wherein anchoring includes at least one of clamping, locking, interlocking, gluing, painting on, adhering and magnetizing the energy gathering sheet onto the surface.

13. The method according to claim 8 wherein providing the energy gathering sheet includes providing a protection layer to protect the energy gathering sheet when rolling the energy gathering sheet and when stacking the energy gathering sheet.

14. The method according to claim 8 wherein the energy gathering sheet is formed of layers comprising at least one of polymers, metal, trapped air, trapped gas, and trapped fluid.

15. An energy gathering system comprising;
    energy gathering means for gathering wind and solar energy, the energy gathering means being less than one inch in size and converting the wind and solar energy into storable electrical energy;
    means for storing the storable electrical energy converted from energy gathered by the energy gathering means;
    means for processing information relating to the energy gathering means;
    means for coupling the energy gathering means to additional energy gathering means;
    means for anchoring the energy gathering means to a surface; and
    means for delivering the storable electrical energy to a destination, the energy gathering means being installable into a roadway energy system.

* * * * *